(12) United States Patent
Damarla

(10) Patent No.: US 8,060,338 B2
(45) Date of Patent: Nov. 15, 2011

(54) ESTIMATION OF GLOBAL POSITION OF A SENSOR NODE

(75) Inventor: Thyagaraju Damarla, Laurel, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 227 days.

(21) Appl. No.: 12/025,160

(22) Filed: Feb. 4, 2008

(65) Prior Publication Data

US 2008/0228437 A1 Sep. 18, 2008

Related U.S. Application Data

(63) Continuation-in-part of application No. 11/094,145, filed on Mar. 31, 2005, now abandoned.

(51) Int. Cl.
*G01C 1/00* (2006.01)
(52) U.S. Cl. .................................................. 702/149

(58) Field of Classification Search ............... 702/149
See application file for complete search history.

(56) References Cited

U.S. PATENT DOCUMENTS

| 6,392,565 B1 * | 5/2002 | Brown | 340/988 |
| 2005/0153786 A1 * | 7/2005 | Petrov | 473/151 |

\* cited by examiner

*Primary Examiner* — Tung S Lau
(74) *Attorney, Agent, or Firm* — Guy M. Miller; Alan I. Kalb

(57) ABSTRACT

Methods and apparatuses for locating a sensor node are disclosed. A representative apparatus, among others, includes a processing unit that receives sensor node data and object trajectory information data for an object. The sensor node data is related to the object's trajectory, and a data point in the object trajectory information data comprises a time stamp and the coordinates of a position. The position corresponds the location of the object at the given time. The processing unit is adapted to correlate at least a portion of the sensor node data with at least a portion of the object trajectory information data to determine an absolute position of the sensor node.

17 Claims, 9 Drawing Sheets

ESTIMATION OF GLOBAL POSITION OF A SENSOR NODE

CROSS-REFERENCE TO RELATED APPLICATIONS

This is a continuation-in-part application of pending patent application Ser. No. 11/094,145, filed Mar. 31, 2005 now abandoned.

GOVERNMENT INTEREST

The invention described herein may be manufactured and used by or for the United States Government for governmental purposes without the payment of any royalties thereon.

BACKGROUND

1. Technical Field

The present disclosure is generally related to determining the absolute position of a sensor node, and more specifically to determining the absolute position of a sensor node that has been disposed in a haphazard manner.

2. Description of the Related Art

The present disclosure pertains to the field of localization of sensors. Sensors are usually deployed in a region to observe the activity in an area of interest. Different sensors are deployed to observe different activity. Acoustic sensors are deployed in a battlefield or in an urban area to monitor acoustic activity, for example, the presence of tanks in the field, to track vehicles, and identify the type of vehicles, etc. In urban settings, acoustic sensors can be deployed to detect congregation of people and the general nature of such a congregation, that is, whether the crowd is hostile or peaceful. The deployed acoustic sensors record the sound waves emanated in the vicinity and transmit to a remote hub or a central observation center where the data (sound waves) is analyzed. The type of analysis employed depends on the type of activity for which one is looking. Tracking vehicles in a field may comprise use of a tracking algorithm, while detecting people in the field may require an entirely different algorithm. In any case, the data analyzed has to be referenced to the location of the sensor. Without the knowledge of the sensor location, the data has no relevance. In a battlefield or in covert operation situations, the sensors may be deployed using an airborne vehicle such as a helicopter or airplane, or the sensors can be deployed by rockets. Whatever mechanism is used for deploying the sensors, the location of the deployed sensors may not be available. It is possible to guess at the general vicinity where the sensors land based on the location of the deploying vehicle, the speed at which the vehicle was flying, the angle at which the sensors were hurled, general wind speeds in the vicinity, the direction in which the vehicle was traveling, etc. The present disclosure presents a robust and elegant means in determining the location of the sensors.

At present, localization methods, e.g., R. L. Moses, R. M. Patterson, and W. Garber, Self localization of Acoustic sensor networks", in Proc. of MSS meeting of the specialty group on Battlefield acoustic and seismic sensing, September 2002 include use of beacons to estimate the time of arrival (TOA) between two sensor nodes, which translates into range after multiplying the TOA with the propagation velocity of the signal in the medium. This range corresponds to the radius of a circle or a sphere, depending on whether the sensor nodes are on a plane or in three-dimensional space. If there are three such circles corresponding to three different TOAs with respect to a sensor node whose coordinates we would like to determine, then these circles would intersect at a common point giving the location of the sensor whose coordinates are desired. In this approach the location of the sensor is obtained relative to the three other sensors. In order to know the global positioning of the sensor, one must have knowledge of the global position of the three sensors. If there is a large number of sensors deployed in a field whose coordinates must be determined, one can use the above technique iteratively to determine their locations. However, that approach may result in cumulative error that grows as a function of distance from one sensor to the other.

SUMMARY

An apparatus and method for locating a sensor node are provided. Briefly described, one embodiment of an apparatus includes a processing unit that receives sensor node data and object trajectory information data for an object. The sensor node data is related to the object from which the bearings of the object can be estimated which in turn are related to the trajectory of the object, and a data point in the object trajectory information data comprises a time stamp and the coordinates of a position. The position corresponds to the location of the object at the given time. The processing unit is adapted to use several bearing estimates from the sensor node data and the corresponding position information of the object to determine an absolute position of the sensor node. An embodiment of a method can be broadly summarized by the following: collecting object trajectory information data for an object, wherein the object trajectory information data is collected over a time span; acquiring sensor node data at the sensor node, wherein the sensor node data is acquired over the same time span and is related to the object trajectory information data; determining several direction indicators, each direction indicator providing an approximate bearing from the sensor node to the object at a given instant of time during the time span the data is collected; and determining coordinates of the sensor node using a portion of the collected trajectory information data and the corresponding direction indicators (bearings) determined by the sensor node data.

Other apparatuses, systems, methods, features, and/or advantages will be or may become apparent to one with skill hi the art upon examination of the following drawings and detailed description. It is intended that all such additional systems, methods, features, and/or advantages be included within this description and be protected by the accompanying claims.

BRIEF DESCRIPTION OF THE DRAWINGS

The components in the drawings are not necessarily to scale. Moreover, in the drawings, like reference numerals designate corresponding parts throughout the several views.

DETAILED DESCRIPTION

It should be emphasized that the above-described embodiments are merely possible examples of implementations. Many variations and modifications may be made to the above-described embodiments. All such modifications and variations are intended to be included herein within the scope of this disclosure and protected by the following claims.

Figure 1:
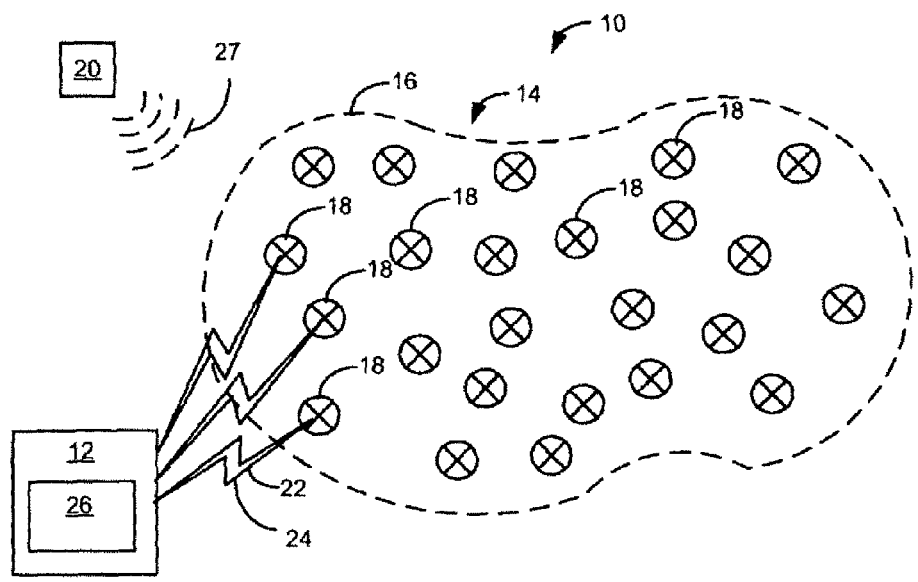
FIG. 1 is a block diagram of a detection system including an array of sensor nodes and a central observation center.

Referring to FIG. 1, a detection system 10 includes a central observation center (COC) 12 and a sensor array 14, which is disposed over a region 16. The sensor array 14 includes a plurality of sensor nodes 18, which are adapted to detect objects 20 including natural objects and man-made objects. The sensor nodes 18 communicate data 22 regarding detected objects 20 to the COC 12 via a wireless communication link 24. The data 22 typically includes a sensor node identifier and a direction indicator, i.e., the angular direction of the detected object from the sensor node 18. In some embodiments, data 22 includes raw data or partially-processed data, and generally includes the sensor node identifier. The COC 12 includes a processing unit 26 that processes the data 22 to determine, among other things, the absolute or global coordinates of the sensor node 18, and/or to identify the detected object 20.

Typically, the sensor nodes 18 passively detect energy 27 that is emitted from the object 20. Non-limiting examples of the types of energy 27 that the sensor nodes 18 are adapted to detect include electromagnetic energy and acoustic energy. It should be noted that the spectrum of electromagnetic energy includes both visible light and non-visible light, such as infrared, and that acoustic energy is not limited to sounds carried by a gaseous medium, such as the Earth's atmosphere, and is medium independent. In other words, acoustic energy can be carried by a gas, solid, or a liquid medium.

Typically, the sensor nodes 18 are disposed over the region 16 in a haphazard or essentially random, unpredictable manner. The sensor nodes 18 can be delivered, among other methods of deployment, to the region 16 by an artillery shell and/or mortar shell, by dropping from one or more aerial vehicles, by dropping from ships and/or submarines, by dropping from a ground vehicle, and/or by dropping by personnel.

Figure 2A:
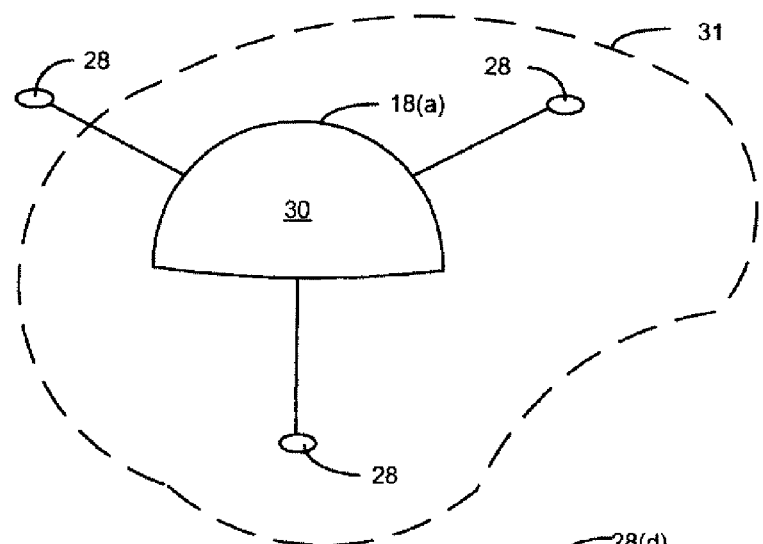
FIGS. 2A-2C are block diagrams of embodiments of sensor nodes of FIG. 1.
Figure 2B:
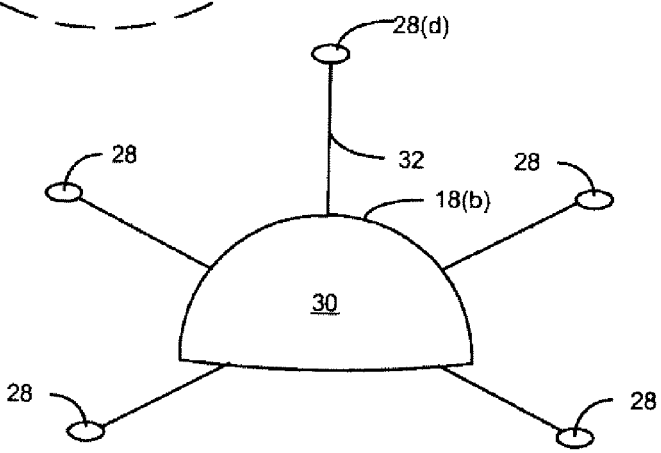
Figure 2C:
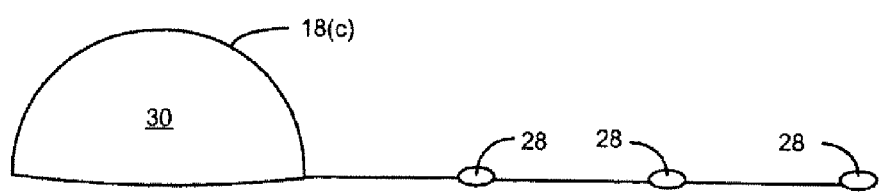

FIGS. 2A-2C illustrate different, non-limiting embodiments of a sensor node 18(a), 18(b), and 18(c), respectively. Each of the sensor nodes 18(a) through 18(c) include a plurality of sensors 28 and a central unit 30.

Sensor node 18(a) includes three sensors 28, which are disposed on the ground 31 in an approximate equiangular distribution about the central unit 30. In the case of acoustic sensors, sensors 28 are microphones.

Sensor node 18(b) includes four sensors 28 disposed on the ground 31 in an approximate equiangular distribution about the central unit 30, and one sensor 28(d), which is elevated off of the ground 31 by a support member 32. The support member 32 extends generally upward from the central unit 30.

Sensor node 18(c) includes a plurality of sensors 28 that are approximately linearly aligned. It should be remembered that sensor nodes 18(a) through 18(c) are non-limiting examples and that, in other embodiments, greater or fewer sensors can be employed and/or the sensors can be deployed about the central unit in other configurations such as essentially random, non-equiangular, etc.

Figure 3:
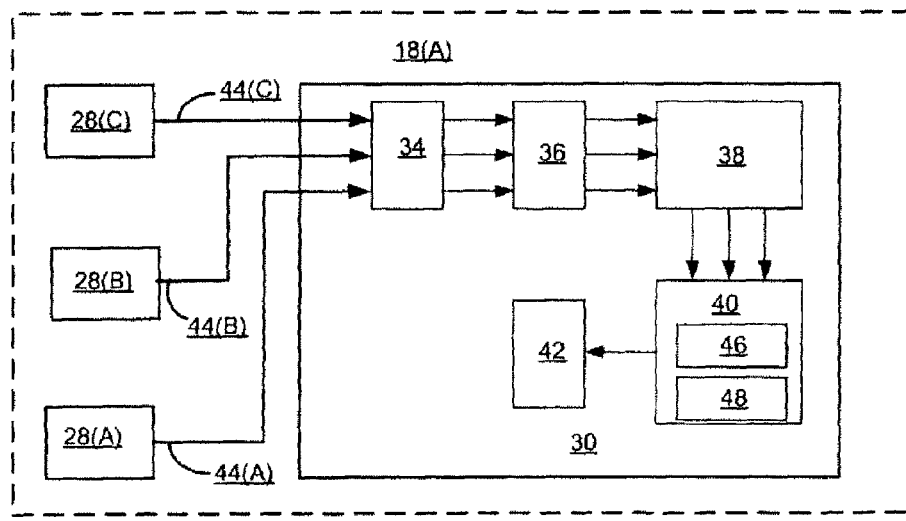
FIG. 3 is a block diagram of the sensor node of FIG. 2A.

FIG. 3 illustrates selected components of the sensor node 18(a). The central unit 30 includes a preamplifier 34, a filter 36, an analog/digital converter (A/D) 38, a direction estimator 40, and a transmitter 42. Sensors 28(a)-28(c) receive energy 27 (for example, helicopter sound in the case of acoustic sensors) and convert the energy into electrical signals, which are then provided to the preamplifier 34 via electrical connectors 44(A)-44(C). Electrical signals from the sensors 28(a)-28(c) are processed by the preamplifier 34, filter 36, and A/D converter 38 independently. The preamplifier 34 amplifies the electrical signals and provides them to the filter 36.

Typically, the filter 36 is an anti-aliasing filter (low-pass filter at half the sampling frequency) that filters unwanted noise from the electrical signals and provides the electrical signals to the A/D converter 38, which digitizes the electrical signals.

The direction estimator 40 receives and processes the digitized electrical signals. In some embodiments, the direction estimator 40 includes a high-resolution direction of arrival angle estimator, namely, a minimum variance distortionless response (MVDR) (Van Veen, B. D., and K. M. Buckley, "Beamforming: a versatile approach to spatial filtering," IEEE ASSP Magazine, vol. 5, pp. 4-24, 1988) and/or a multiple signal classification (MUSIC) (Adaptive Filter Theory by S. Haykin, published by Prentice Hall, 1991) module for determining a direction of arrival (DOA) angle (also called the bearing angle of the target) of the signal from the object 20. The direction indictor includes a bearing. The bearing is the angular difference between a local reference axis and a vector extending from the sensor node towards the detected object 20. In some embodiments, the direction estimator 40 also includes a source identifier module 46, which analyzes received energy to identify the detected object 20. In other embodiments, modules such as the direction estimator 40 and the source identifier module 46 are included in the processor 26.

In some embodiments, the direction indicator includes a single azimuthal angle corresponding to azimuth used in two-dimensional polar coordinates and the time stamp. In some embodiments, the direction indicator includes two angles corresponding to azimuth and zenith (elevation) used in three-dimensional spherical coordinates and the time stamp.

A module such as the direction estimator 40 and the source identifier module 46, and any sub-modules, may comprise an ordered listing of executable instructions for implementing logical functions. When a nodule and/or any sub-modules are implemented in software, it should be noted that the modules can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. The direction estimator 40 and the source identifier module 46, and any sub-modules can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any appropriate mechanism that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured via, for instance, optical scanning of the paper or other medium, then compiled, interpreted, or otherwise processed in a suitable manner if necessary, and then stored in a computer memory.

In some embodiments, the sensor node 18 may include a data recorder 48 on which data from the sensors 28 is recorded. Typically, recorded data includes both sensor data and a time that is associated with the sensor data. In some embodiments, the direction estimator 40 then processes recorded data to determine a direction indicator. In other embodiments the sensor node 18 transmits recorded data to the COC 12.

The transmitter 42 receives the direction indicator from the direction estimator 40 and transmits a direction indicator message to the central observation center 12. Typically, the direction indicator message includes a sensor node identifier and a direction indicator. However, in some embodiments, the transmitter 42 sends partially processed or digitized raw data to the COC 12, and the COO 12 determines, among other things, the direction from the sensor node 18 to the object 20. Furthermore, in some embodiments the COC 12 can use the data from the sensor node 18 to identify the object.

Determination of Sensor Position

As previously described above, the sensor nodes 18 are usually disposed ill a haphazard, or essentially random manner. Consequently, the absolute position of the sensor nodes 18 is usually not known when the sensor nodes 18 are deployed.

In some situations, especially when the topography of the region 16 is relatively flat, the absolute position of the sensor node 18 can be represented by two coordinates. Frequently, two coordinates are used when the objects that are to be detected are objects such as infantry vehicles, etc., which move in the same general plane as the sensor nodes 18 in the sensor array 14. In other situations, absolute sensor positions are determined in three-dimensional coordinates (x, y, z) in Cartesian coordinate system, and (r, θ, Φ) in polar coordinate system, etc.

Figure 4:
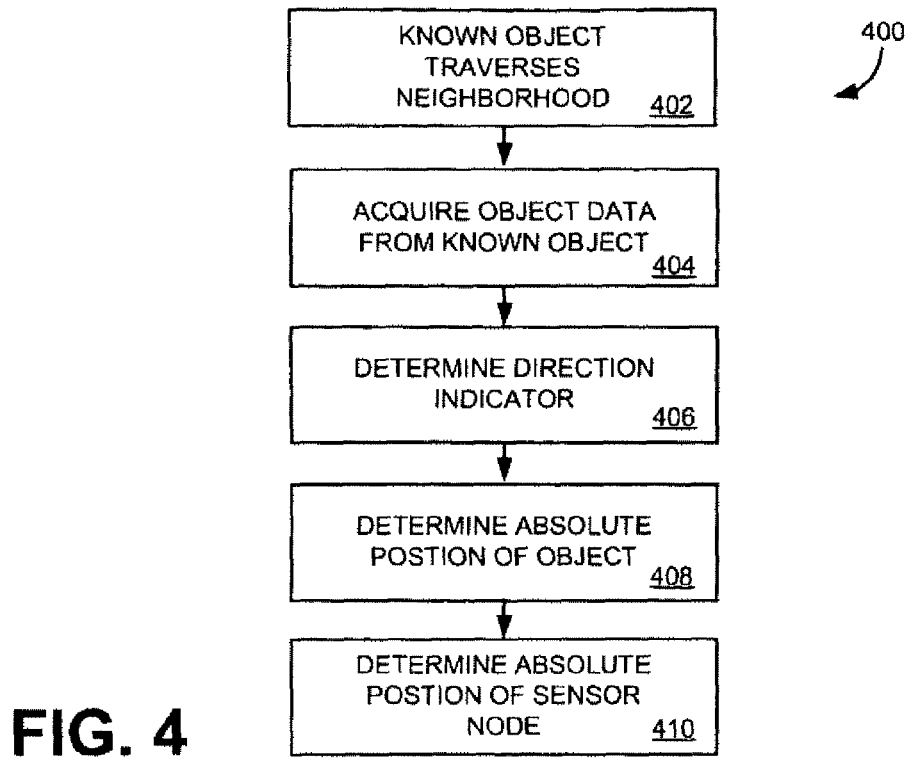
FIG. 4 is an exemplary flow chart of a method for locating a sensor node.

FIG. 4 is a flow chart of exemplary steps 400 used for determining the absolute position of a sensor node 18. In this disclosure, flow charts show the architecture, functionality, and operation of a possible implementation of, among other things, the sensor node 18 and the processing unit 26. In this regard, each block represents a module, segment, or portion of code, which comprises one or more executable instructions for implementing the specified logical function(s). It should also be noted that in some alternative implementations, the functions noted in the blocks may occur out of the order noted in the flow charts of this disclosure. For example, two blocks shown in succession may in fact be executed substantially concurrently or the blocks may sometimes be executed in the reverse order, depending upon the functionality involved, as will be further clarified in the following.

Figure 5:
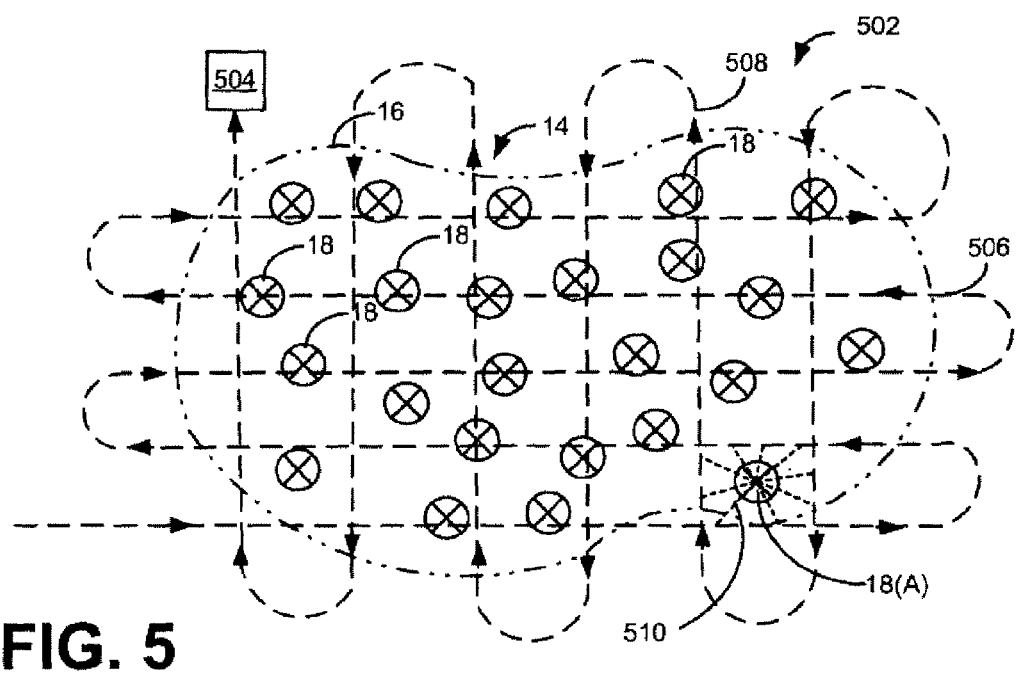
FIG. 5 is diagram of trajectory path over the array of sensor nodes of FIG. 1.

Referring to FIG. 4, in step 402, a "known source"/object moves in the neighborhood of the sensor array 14. FIG. 5 illustrates an exemplary "footprint" or path 502 of an object 504 over the sensor array 14. Typically, the object 504 traverses the neighborhood of the sensor array 14 in two back-and-forth motions. The first back-and-forth motion includes x-axis legs 506 and the second back-and-forth motion includes y-axis legs 508. Preferably, the x-axis legs 506 are approximately perpendicular to the y-axis legs 508. For the sake of simplicity, assume the x-axis legs are approximately parallel to East-West direction and the y-axis legs are approximately parallel to North-South direction.

Figure 6A:
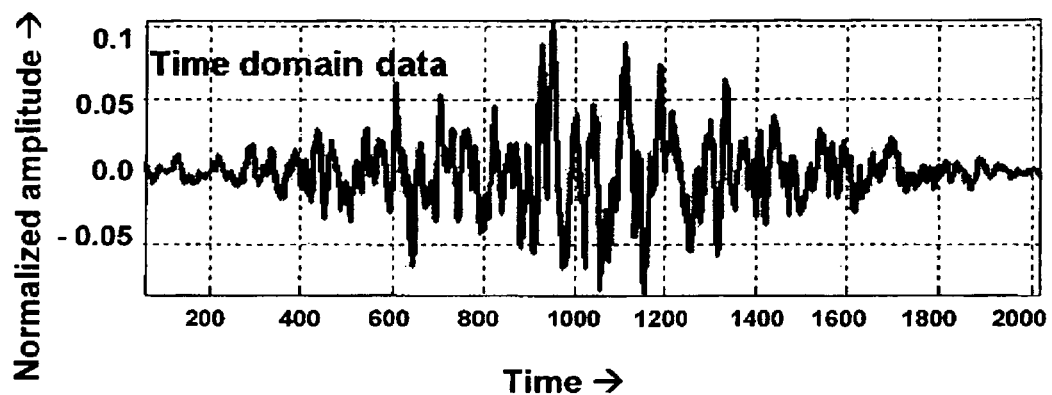
FIG. 6A is a diagram of sensor node data.
Figure 6B:
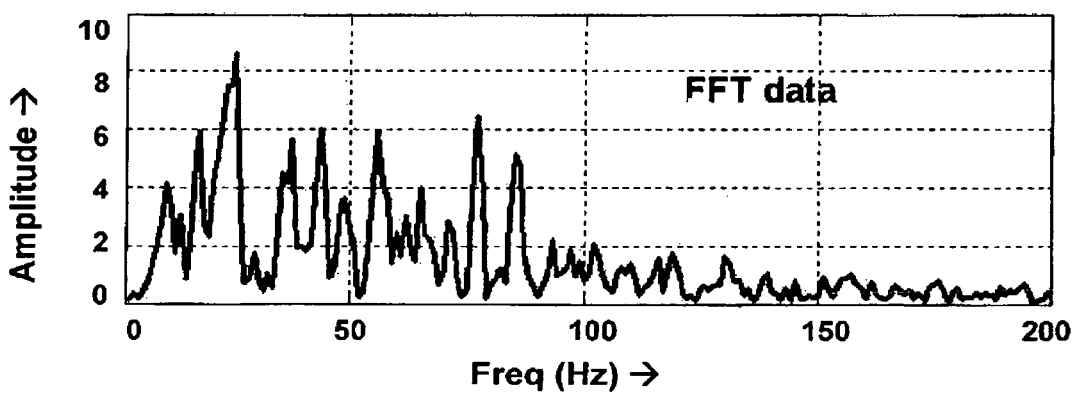
FIG. 6B is a diagram of the frequency spectrum of the sensor node data of FIG. 6A.

In one embodiment, the object 504 is a helicopter, which could also have been used to deploy the sensor nodes 18. As the helicopter flies in the neighborhood of a sensor node 18(a), the sensor node 18(a) receives the sound waves (acoustic signals) generated by the helicopter. The acoustic signals, which are mainly due to the rotor rotating and the tail fan, have distinctive frequency components that correspond to the speed of the rotors, which can be extracted by signal processing techniques. FIG. 6A illustrates typical time domain data of the acoustic signal of a helicopter, and FIG. 6B illustrates the frequency components (as given by the fast Fourier transform (FFT)) of the acoustical energy emitted from the helicopter. In FIG. 6A, the time domain data is normalized and multiplied by the hamming window to reduce the effect of noise.

In step 404, the sensor nodes 18 acquire source data as the object 504 commences on path 502. In step 406, direction indicators are determined using MVDR or MUSIC as mentioned earlier. In one embodiment, each sensor node 18 determines multiple direction indicators from the source data, and relays the direction indicators to the COC 12. In other embodiments, source raw data is communicated to the COC 12, and the processing unit 26 determines the direction indicators. Referring back to FIG. 5, dashed lines 510 represent nine different direction indicators, which include bearings, that are determined as the object 504 traverses the neighborhood of sensor node 18(a). Note that several hundred direction indicators can be used for sensor localization, that is, to determine the location(s) of the sensor(s) 18.

In step 408, the absolute position of object 504 as it traverses path 502 is determined. In one embodiment, the object 504 receives global positioning system (GPS) signals, which the object 504 uses to determine its absolute position. In that case, the object 504 provides its position to the COC 12 along with the time stamp. Typically, the object 504 receives GPS information for determining its absolute position, and the absolute position of the object 504 is determined and recorded every second or so as the object traverses path 502. In some embodiments, the object 504 transmits trajectory information (time, position) as the object 504 traverses the path 502. The coordinates of the position can be casting, northing, and altitude. Sometimes, GPS systems give the longitude, latitude and altitude instead of casting, northing, and altitude. However, the conversion from longitude and latitude to casting, and northing is straightforward.

In addition, in some embodiments, the direction estimator 40 for the sensor node 18 is time synchronized with the GPS time so that the direction indicators generated from the sensor node have the same time reference. Generally, the coordinates of the helicopter are determined or recorded every second.

In some embodiments, the object 504 includes a recorder (not shown) that records the trajectory information. The recorded trajectory information includes the time and position of the object 504 as it traverses in the neighborhood of the sensor array 14, and the trajectory information is recorded every second or so.

Alternatively, the position of the object 504 can be determined using methods other than GPS. In yet another embodiment, the object 504 can be detected by a detector (not shown) such as a radar station, sonar detector, laser station, etc., which could then determine the global position of the object. The detector can then provide the global position of the object to the COC 12.

In step 410, absolute sensor node positions are determined using object trajectory information, i.e., the position as a function of time of the object 504. The processing unit 26 correlates trajectory information of object 504 (position, time) with direction indicator data (direction, time) to determine the absolute position and orientation of a sensor node 18. Generally, the absolute sensor node position is determined using an iterative process. First, an approximate location of the sensor node is determined using three or more trajectory information data points and well-known trigonometric relationships. More than three data points are used if the absolute sensor node position is to be determined in three coordinates. After the initial absolute position has been determined, then the absolute sensor node position is refined using additional trajectory information data points.

In some embodiments, the COC 12 also receives GPS signals and then uses them to, among other things, synchronize a clock with the timing information included in the trajectory information of the object 504. The COC 12 associates the time of reception of the data from a sensor node, and then correlates the data with the trajectory information. The direction indicator data includes a time stamp. The time stamp corresponds to the time at which the sensor node 18 determined the direction indicator or the time at which the sensor node 18 detected the object 504. If the data from the sensor node includes a time stamp, then the time stamp can be used to, among other purposes, correlate the trajectory information of the object 504. In order to determine the coordinates of a sensor node 18, one has to perform the steps 404, 406 and 410 listed in the FIG. 4 for each sensor node 18 while step 402 and 408 are common for all the sensor nodes. To recap, step 404 implies that the sensor node 18 collects signals emitted by the object 20 (504), step 406 determines the bearing angles of the detected object 20 (504) with respect to some reference axis at the sensor node 18 using the data (signals) collected in step 404. Step 408 determines the coordinates of the object 20 (504) for the same time stamps of the data collected in step 404. Step 410 uses the coordinates of the object 20 (504) and the bearing estimates generated in steps 408 and 406 respectively to determine the coordinates of the sensor node 18.

Figure 7:
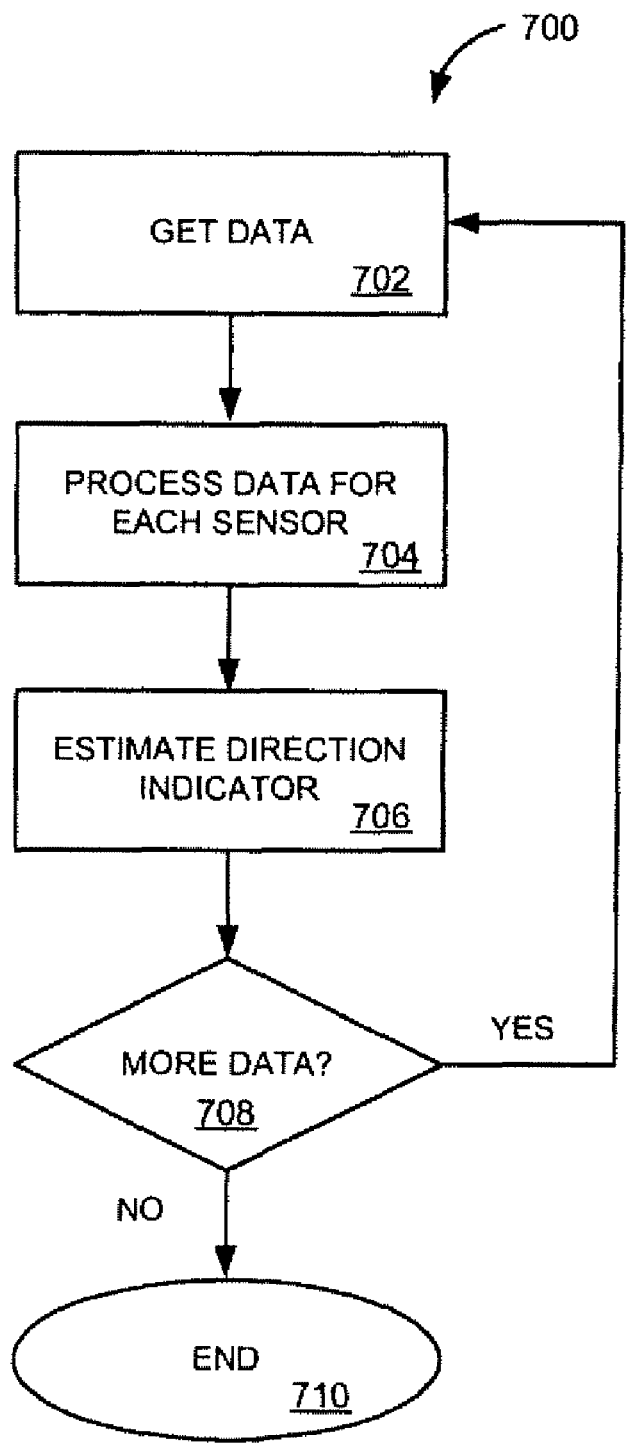
FIG. 7 is an exemplary flow chart of a method for determining sensor node bearing angles.

FIG. 7 is an exemplary flow chart 700 of one method, among others, for determining the bearing angles of the detected object 20 or known object 504, i.e., the angle between a local reference axis at the sensor node 18 and a ray extending from the sensor node towards the detected object, using the raw data collected by the sensor node 18. It should be emphasized that the steps illustrated in FIG. 7 can be implemented in at least the sensor node or the COC 12, or in a combination of both the sensor node and COC 12. The flow chart shown in FIG. 7 is the detailed description of the step 406 in FIG. 4 that was mentioned in the previous paragraph.

In step 702, the sensor node 18 collects data. Typically, the sensor node 18 passively collects the data by detecting energy 27 emitted from the detected object 20 or known object 504.

In step 704, data from each one of the sensors 28 in the sensor node 18 is processed. Typically, the processing includes, among other things, filtering and digitizing the data. The data can be processed at the sensor node or at the processing unit 26.

In step 706, the data from all of the sensors 28 is used to determine the bearing angle of the object 20 (504) using techniques such as MVDR (Van Veen, B. D., and K. M. Buckley, "Beamforming: a versatile approach to spatial filtering," IEEE ASSP Magazine, vol. 5, pp. 4-24, 1988) and/or a MUSIC (Adaptive Filter Theory by S. Haykin, published by Prentice Hall, 1991) which are well known techniques.

In step 708, a determination is made as to whether there is more data, i.e., whether the sensors of the sensor node continue to detect the object or have detected another object. If there is more data, then the process returns to step 702, otherwise, the process ends at step 710.

Step 408 in FIG. 4 pertains to recording the global position and time information of the object 20 (504) from GPS. More is said about this later. The final step 410 in FIG. 4 is where the coordinates of each sensor node 18 is determined. Detailed steps involved in step 410 of FIG. 4 are given in FIG. 8. The process of determining the coordinates of the sensor node 18 has four major steps as listed below:

Use three points, whose coordinates are known (FIG. 9), on the trajectory of the object 20 (504) and the corresponding bearing estimates from the sensor node 18 to estimate approximate location of the sensor node 18 using geometry (FIG. 10).

Use the approximate location of the sensor node 18 estimated in the above step to compute the bearing angles of the object 20 (504) for each point on the trajectory with known coordinates using geometry.

Find the difference in the estimated bearing angles of the object 20 (504) in the previous step and the bearing angles of the object estimated from the data (for example, acoustic signals). Find the offset ($\epsilon$) angle, that is, the difference between the global reference (usually true north) and the local reference of the sensor node 18.

Adjust the location of the sensor node 18 till the difference in bearing angles listed in the previous step is minimum. Last three steps are iterated till the difference in bearing angles can not be reduced any further (FIG. 11).

Figure 8:
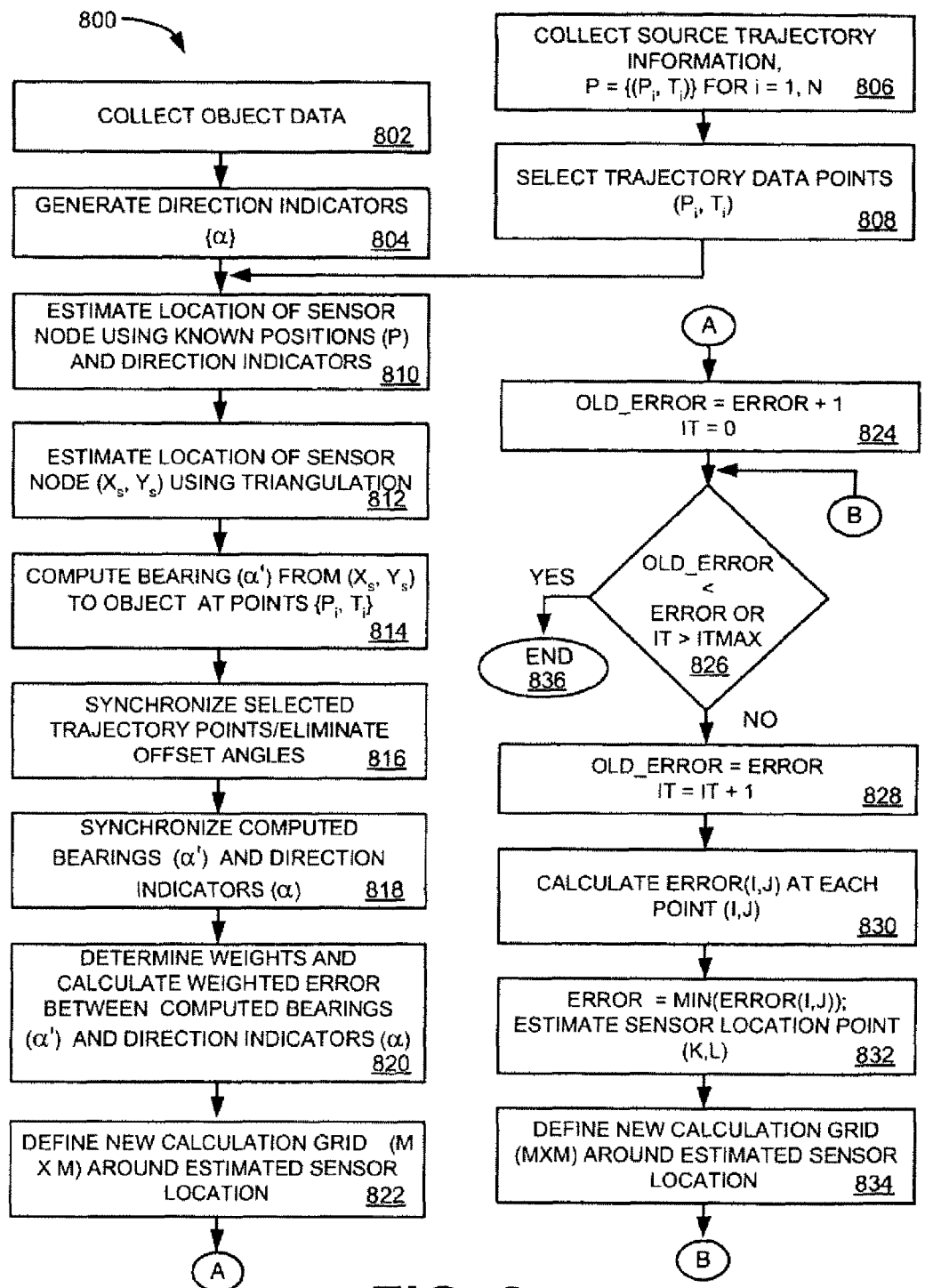
FIG. 8 is an exemplary flow chart of a method for locating a sensor node.

FIG. 8 is a detailed flow chart of FIG. 4, of exemplary steps 800 for determining the location of a sensor node. Steps 802, 804, 806 and 808 correspond to data acquisition by the sensor node of the object 20 (504) and collection of global positioning information of the object 20 (504) as it traverses the trajectory path. We elaborate each one of these steps. In step 802, the sensor node collects data, i.e., the sensor node detects an object (object 504) as the object traverses the neighborhood of the sensor node. In some embodiments, the sensor node collects data over a time span and associates the time at which the sensor collected the data with the data. Typically, a sensor node data point is comprised of a time stamp and a period of collected data. Typically, the period is approximately one second or so.

In step 804, for a set of data points from the sensor node, direction indicators or bearings of the object 20 (504) are calculated using well known and well documented techniques in the literature such as MVDR or MUSIC. The direction indicators are measured relative to a local reference axis. This local reference axis may be different from the global reference axis (normally global reference axis is true north). The offset between the two references is denoted by '$\epsilon$'. The set of sensor node direction indicators (or object bearing angles) are denoted by $A=\{\alpha_1, \alpha_2, \ldots, \alpha_m\}$, where $\alpha_i$ is the angle between a local reference axis and a ray extending from the sensor node towards the detected object and where the $\alpha$'s are calculated using collected sensor node data using either MVDR or MUSIC or ally other angle estimator.

Steps 802 and 806 are done essentially concurrently. In step 806, the trajectory information of the object 504, which is traversing the neighborhood of the sensor node 18, is collected. The trajectory information of the object 504 is provided to the COC 12. Typically, trajectory information associates the position (the coordinates) of the object 504 at a given instance of time. The object's trajectory information is normally recorded every second or so and an object trajectory information data point comprises a time stamp and a given position, where the time stamp corresponds to when the object was located at the given position. In some embodiments, the object's trajectory information is determined by a GPS system. In other embodiments, the object's trajectory information is determined using other detectors that can determine the absolute or global position of the object 504 while the object 504 traverses the neighborhood of the sensor node.

In step 808, a subset of trajectory points of the object 504 is selected to be used in determining the sensor node 18 coordinates as some trajectory points result in more error in the sensor node coordinates than the other points. In step 808, the source trajectory information data points are analyzed such that selected data points are used to determine the coordinates and orientation of the sensor node. The accuracy of the sensor node localization (position and orientation) depends in part on the estimation accuracy of angles in the direction indicator. When the object 504 is near the closest point of approach (CPA), the direction indicator may change rapidly if the relative distance between the sensor node 18 and the object is small. When the angles are changing rapidly, it can be difficult to estimate the sensor node bearing angle accurately and the sensor node localization accuracy suffers when inaccurate bearing angles are used. In order to improve the sensor node localization accuracy, the points on the object trajectory information at which the rate of change of direction angle from one second to another second is greater than a predetermined angle ($\phi$) are excluded. In most of the situations, $\phi$ is approximately tell degrees (10°). Although an angle $\phi$ of approximately ten degrees has been explicitly identified as an example, other angles are possible.

The points at which the direction indicator angles change fast can be determined by computing the difference between the adjacent direction indicator angles estimated using sensor node data. Those points with a difference greater than $\phi$ (10°) can be eliminated from the list of trajectory information data points used to calculate the sensor node coordinates.

In this description, the coordinates of the sensor node are given in two dimensions. Consequently, the coordinates of the sensor node are initially calculated from the intersection of two circles. If the unknown coordinates of the sensor node were in three dimensions, then the unknown coordinates would be calculated from the intersection of three spheres.

Figure 9:
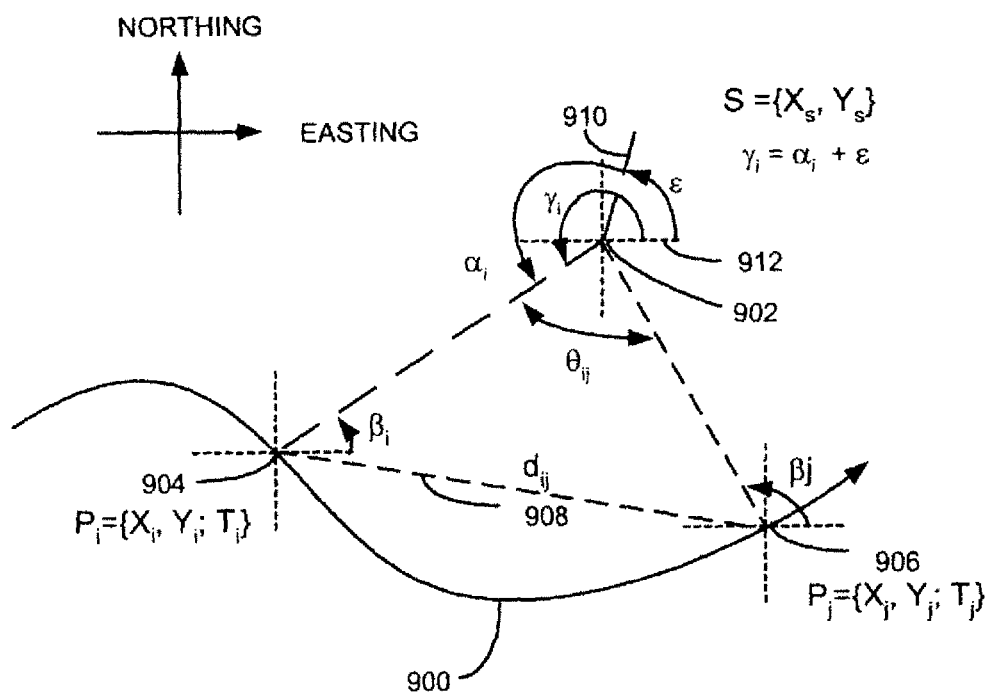
FIG. 9 is a diagram of triangulating on the location of a sensor node.

Estimation of the approximate coordinates of a sensor node 18: Initial estimation of the approximate coordinates of a sensor node 18 is done by first selecting three points on the trajectory of the object 504 and corresponding (same time stamps) bearing angles determined from the data collected at the sensor node 18. Selection of the three points on the trajectory and the estimation of the approximate coordinates of the sensor node 18 is elaborated further. FIG. 9 illustrates a portion of a path 900 of a known object (not shown) and a sensor node 902. Points on the path 900 are used to determine the coordinates of the sensor node 902. Specifically, points 904 and 906 correspond to the position of the object at times $t_i$ and $t_j$, respectively. The trajectory information for point 904 is denoted by Pi=$(x_i, y_i; t_i)$ and for point 906 is denoted by Pj=$(x_j, y_j; t_j)$. Line 908 denotes the distance $(d_{ij})$ between the points 904 and 906.

In order to reduce errors, object trajectory information data points are selected based upon angular separation ($\theta$) as measured at the sensor node and the distance between data points. Because the location of the sensor node is unknown, the distance $(d_{ij})$ between $P_i$ and $P_j$ is used as a parameter for selecting triangulation points. Generally, it is found that when the distance between $P_i$ and $P_j$ is greater than 300 meters a reasonable accuracy for the sensor node location is obtained.

Figure 10A:
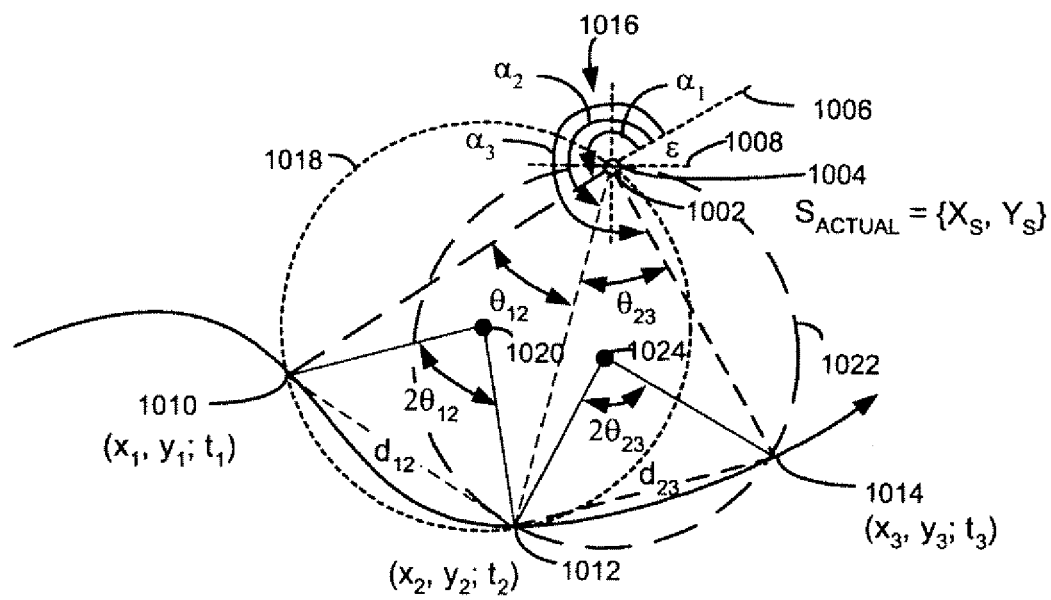
FIGS. 10A and 10B illustrate a process for locating a sensor node using geometric and trigonometric relationships.

In step 810, a first estimate of the coordinates of the sensor node is determined using object trajectory information data points and sensor node direction indicators. Referring to FIG. 10A, a sensor node 1002 is disposed at a location 1004. The absolute, but unknown, coordinates of the sensor node 1002 are denoted by $S_{ACTUAL}=(X_s, Y_s)$. Line 1006 represents the local reference axis, and the local reference axis 1006 is offset from a global reference axis 1008 by an amount epsilon ($\epsilon$). In FIG. 10A, points 1010, 1012, and 1014 represent three object trajectory information data points, which are denoted by $(x_1, y_1; t_1)$, $(x_2, y_2; t_2)$, and $(x_3, y_3; t_3)$, respectively.

FIG. 10A illustrates that the bearing angles 1016 included in the direction indicators are measured from the local reference axis 1006 of the sensor node 18, and are denoted as $\alpha_1$, $\alpha_2$, and $\alpha_3$. These angles $\alpha_1$, $\alpha_2$, and $\alpha_3$ correspond to the points 1010, 1012 and 1014 of the trajectory of the object 504 respectively.

Triangulation cannot be used to find the actual coordinates $(X_s, Y_s)$ of the sensor node 1002 because the orientation of the local reference axis 1006 is unknown. Consequently, the coordinates of position 1004 are determined using geometric and trigonometric relationships. So, instead of working with the angles $\alpha_1$, $\alpha_2$, and $\alpha_3$ directly, work with the differences in angles, effectively nullifying the effect of orientation of the reference axis. Construct two circles with one of the intersection point giving the coordinates of the sensor node 18 using the differences in angles, and the known distances between the points 1010, 1012 and 1014. The description of construction of the two circles to determine the coordinates of the sensor node 18 follows.

A first circle 1018 whose center 1020 is denoted by $C_1$ and whose radius is denoted by $R_1$ is computed using positions 1010 and 1012 and $2\theta_{12}$, where $\theta_{12}$ is the absolute value of the difference between $\alpha_1$, and $\alpha_2$, $\theta_{12}=|\alpha_1-\alpha_2|$. The circumference of the first circle 1018 includes points 1004, 1010, and 1012.

A second circle 1022 whose center 1024 is denoted by $C_2$ and whose radius is denoted by $R_2$ is computed using positions 1012 and 1014 and $2\theta_{23}$, where $\theta_{23}$ is the absolute value of the difference between $\alpha_2$, and $\alpha_3$, $\theta_{23}=|\alpha_3-\alpha_2|$. The circumference of the second circle 1022 includes points 1004, 1012, and 1014.

Figure 10B:
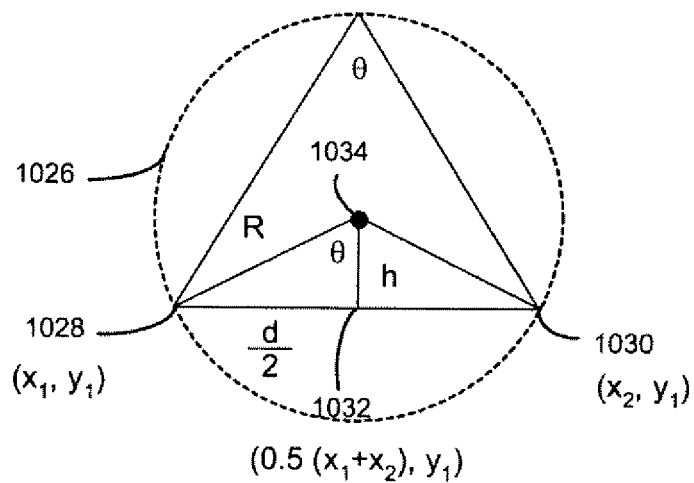

The coordinates of the center (C) and the radius (R) of each circle is determined using known quantities. Specifically, two known positions and the difference in the bearing angles ($\theta$) for those two known positions are used to determine each circle. Referring to FIG. 10B, a simple case of finding the coordinates of the center of a circle 1026 is illustrated. In this example, the two known positions 1028 and 1030 have coordinates $(x_1, y_1)$ and $(x_2, y_1)$, respectively, and are separated by a distance of d, $d(x_2-x_1)$. Point 1032 represents the midpoint of the line connecting positions 1028 and 1030. The coordinates of point 1032 are $(0.5(x_1+x_2), y_1)$. The radius of the circle is found from the relationship $R=(d/2)/\sin(\theta)$. The distance (h) from point 1032 to the center C 1034 is are found from the relationship $h=R\cos(\theta)$. Thus, in this example, the coordinates of the center C 1034 are $(0.5(x_1+x_2), y_1+R\cos(\theta))$. It is a simple procedure to find the center of a circle or a sphere when the known points do not lie in the same horizontal plane.

Once the coordinates of the centers 1020 and 1024 are known and the radii $R_1$ and $R_2$ are known, the intersection point (point 1004) of the circles 1018 and 1022 is calculated, and the calculated coordinates of the intersection point are regarded as the first estimated location of the sensor node 1002. With an estimated location of the sensor node 1002, a first estimation of the offset angle ($\epsilon$) between the local reference axis 1006 and the global reference axis 1008 is determined.

Referring back to FIG. 8, in step 812, the coordinates of the sensor node are estimated using object trajectory information data and the sensor node direction indicators to triangulate upon the sensor node. Triangulation is now possible because a first approximation of the offset ($\epsilon$) between the local reference axis and the global reference axis has been calculated.

The initial approximate estimate of the coordinates of the sensor node 18 is refined by averaging the estimates of the coordinates of the sensor node 18 using triangulation. The procedure is illustrated. Proper selection of points for triangulation results in minimizing triangulation errors. For the purposes of this disclosure, the position of a sensor node is denoted by S and P identifies the recorded object trajectory information data, i.e., P is a list of positions $\{P_1, P_2, \ldots P_N\}$ at times $\{t_1, t_2, \ldots t_N\}$.

As illustrated in FIG. 9, the sensor node direction indictor or the estimate of the bearing angle given by MVDR/MUSIC is an estimate of angle '$\gamma_i$', which is given by $$\gamma_i = \alpha_i + \varepsilon = \tan^{-1}\left(\frac{P_{xi}}{P_{yi}}\right), \quad \text{[Equation 1]}$$

where $\alpha_i$ is measured with respect to the local reference axis 910, $\epsilon$ is the offset of the local reference axis 910 and the global reference axis 912, and $\gamma_i$ is measured with respect to the global reference axis 912. In order to perform triangulation using any two positions on a trajectory of the object 504, the $\gamma$'s are translated into angles measured from the position of the object, as shown in FIG. 9. The translation is straightforward and is given by $$\beta_i = \text{mod}(180+\gamma_i, 360), \quad \text{[Equation 2]}$$

where 'mod' is the modulo operator.

The distance between the two points $P_i$ and $P_j$ is needed for triangulation. This distance is the Euclidean distance and is given as $$d_{ij} = \sqrt{(x_i-x_j)^2 + (y_i-y_j)^2}, \quad \text{[Equation 3]}$$

where $P_i=(x_i, y_i)$ and $P_j=(x_j, y_j)$, respectively. Once the distance $d_{ij}$ between two points on the trajectory and the angles $\beta_i$ and $\beta_j$ are determined, triangulation can be performed using the principles of trigonometry to find the location of the sensor node. Let $P=\{P_i, P_j\}$ represent the pairs of points such that the distance $d_{ij}>300$ meters. Note that $P_i$ is the location of object at some instant of time $t_i$ in terms of casting and northing.

Let $\alpha=\{(\alpha_i, \alpha_j)\}$ be the corresponding pair of direction indicators, where $\alpha_i$ is the bearing angle estimated by the direction estimator at the instant of time $t_i$. The corresponding translated angles with respect to the points $P_i$ and $P_j$: $\beta=\{(\beta_i, \beta_j)\}$ are calculated using the sensor node bearing angles ($\alpha$) and the offset angle ($\epsilon$), which was determined in step 810.

For each pair of points $(P_i, P_j)$ in P, the corresponding pair of angles $(\beta_i, \beta_j)$ are used to estimate the location of the sensor.

Let $S=\{S_i, S_j, \ldots S_m\}$ be the set of estimates given by the elements of P, where $S_i=(X_{Si}, Y_{Si})$ and $X_{Si}$ is the easting (x-coordinate) and $Y_{Si}$ is the northing (y-coordinate) of the sensor location as estimated using pairs of data points $P_i$ and $P_j$. The initial estimate of the sensor location based upon triangulation is the mean value of the set S and is given by $$S_{EST} = (X_{EST}, Y_{EST}) = \left(\frac{1}{m}\sum_{i=1}^{m} X_{Si}, \frac{1}{m}\sum_{i=1}^{m} Y_{Si}\right). \quad \text{[Equation 4]}$$

In step 814, object bearing angles, which are denoted by $A'=\{\alpha'_1, \alpha'_2, \ldots, \alpha'_n\}$, are calculated using the estimated position ($S_{EST}=(X_{EST}, Y_{EST})$) of the sensor node and the object trajectory information data.

In step 816, the object trajectory information and the sensor node data are synchronized such that the offset angle ($\epsilon$) between the local reference angle and the global reference angle is eliminated.

The trajectory information of the object 504 consists of the position information along with the time stamps. These recorded time stamps are accurate to 1 sec. However, since the object 504 is moving the actual position information and the corresponding time stamps may be off by few milliseconds. Hence, synchronization of the bearing angles of the object trajectory points computed using the estimated sensor coordinates and the bearing angles determined from the data at sensor node 18 need to be synchronized in order to estimate the coordinates of the sensor node 18. Moreover, there is propagation delay of the signals from the object 504 to the sensor node 18. This delay depends on the separation distance between the sensor node 18 and the object 504. This process of synchronization is presented here. In step 818, the object bearing angles, $A'=\{\alpha'_1, \alpha'_2, \ldots, \alpha'_n\}$, are synchronized with the sensor node bearing angles, $A=\{\alpha_1, \alpha_2, \ldots, \alpha_m\}$. Provided below is exemplary code for synchronizing the sensor node data with the object trajectory information. In the exemplary code, the object bearing angles, $A'=\{\alpha'_1\alpha'_2, \ldots, \alpha'_n\}$ are denoted as "hel_angls," and the sensor node bearing angles, $A=\{\alpha_1\alpha_2, \ldots, \alpha_m\}$, which are generated from the data of sensor node, are denoted as "luk_angls". If there is a time offset between the two sets of data, then it is corrected such that they are synchronized while adjusting for the orientation of the sensor node.

Exemplary Algorithm for Time Synchronizing hel_angls and luk_angls and Determining the Orientation of Sensor Array:

```
offset_limit = 180;
max_s = 0;
for time_delay = -10: 1: 10,
    hangls = delay "hel_angls" by the amount time_delay;
    for offset_ang = - offset_limit : 1 : offset_limit
        langls = mod(luk_angls + offset_ang, 360);
        d = abs(langls - hangls);
        s = num. of elements in d <= 5;
        if s > max_s
            orientation = offset_ang;
            time_offset = time_delay;
            luk_angls_new = langls;
            hel_angls_new = hangls;
            max_s = s;
        end
    end
end
```

```
    luk_angls = luk_angls_new;
    hel_angls = hel_angls_new;
```

In the above algorithm, a coarse time delay in a number of seconds is determined. The following exemplary algorithm is then used to time synchronize the luk_angls with the hel_angls to a fraction of a second.

Algorithm for Synchronizing luk_angls with hel_angls to a Fraction of a Second:

```
max_s = 0;
n = num. of elements in luk_angls;
time_in_secs = 2:n-1;
for time_delay = -1:0.1:1,
    x = time_in_secs + time_delay;
    angls = interpolate luk_angls to provide values at new time given by 'x';
    langls = mod(angls, 360);
    d = abs(langls - hel_angls);
    s = num. of elements in d <= 5;
    if s > max_s
    luk_angls_new = langls;
    max_s = s;
    end
end
luk_angls = luk_angls_new;
```

A better estimated sensor node location can be determined now that the offset ($\epsilon$) has been removed from the sensor node bearing angles, $A=\{\alpha_1, \alpha_2, \ldots, \alpha_m\}$ and now that the sensor node data is synchronized with the object trajectory information. The refinement of the sensor node location is done in iterations. The refinement process consists of searching a 10 m by 10 m local area around the initial estimated location of the sensor node 18 that gives minimum weighted mean squared error between the $A=\{\alpha_1, \alpha_2, \ldots, \alpha_m\}$ and $A'=\{\alpha'_1, \alpha'_2, \ldots, \alpha'_m\}$. The reason for using weighted mean squared error instead of mean squared error is that the error in determining the angle of bearing $\alpha_i$ increases with the distance between the sensor node 18 and the object 504 as the signal strength decreases, hence signal to noise ratio, with distance. The weights are selected so that they are inversely proportional to the distance. The new location that gives the minimum weighted mean squared error is declared as the new estimated location of the sensor node 18. The process is repeated until the weighted mean squared error no longer decreases. The description of this process follows.

In step 820, the data is weighted and the mean square error between the sensor node bearing angles and the object bearing node angles is determined. In some embodiments, the mean square error is calculated as follows:

Generation of Weights:

Let $dst_i = \sqrt{(X_{EST}-x_i)^2 + (Y_{EST}-y_i)^2}$. Then define the weights as $$w_i = \left(\frac{1}{\log 10(dst_i)}\right)$$

for all i, where estimated coordinates of the sensor node 18 are given by $(X_{EST}, Y_{EST})$ and the coordinates of the points $P_i=(x_i, y_i)$ on the object trajectory. The weights are inversely proportional to the log of the distance between the estimated sensor node location and the known object positions.

Generation of Weighted Mean Squared Error:

Let $d_i = |(\alpha_i - \alpha'_i)|$, where $\alpha_i$ and $\alpha'_i$ are the sensor node bearing angles and object bearing angle, respectively, and then the weighted mean bearing angle difference is given by $$md = \frac{1}{n}\sum_{i=1}^{n} d_i * w_i.$$

The error then given by $$error = \sqrt{\sum_{i=1}^{n} dd_i^2},$$

where $dd_i = d_i * w_i - md$.

In step 822, a calculation grid is established around the estimated sensor node coordinates. An example of such a calculation grid is identified in FIG. 11A with reference numeral 1100. The calculation grid 1100 can be of arbitrary size. As a non-limiting example, the calculation grid 1100 has one meter (m) increments and extends ten meters in both positive and negative directions for both the x-axis and y-axis from the estimated sensor node position, $(X_{EST}, Y_{EST})$ 1102. This generates a grid of 21 by 21 points (1104). However, it should be noted that the grid need not be square.

Returning, to FIG. 8, the calculated error is incremented and stored as "old_error" and an iteration counter is set to zero, as indicated in step 824. An iteration counter is used so that the process of refinement does not continue without bounds.

In step 826, the calculated error is compared with the stored old_error, and the iteration counter is compared to a maximum number of iterations. If the iteration count is greater than a maximum number of iterations, or if the old_error is less than the calculated error, then the process proceeds to step 836 and ends. In the first iteration, the conditions always fail and the procedure continues through steps 828 through 834.

In step 828, the stored "old_error" is updated such that it is equal to the calculated error and the iterations counter is incremented.

Figure 11A:
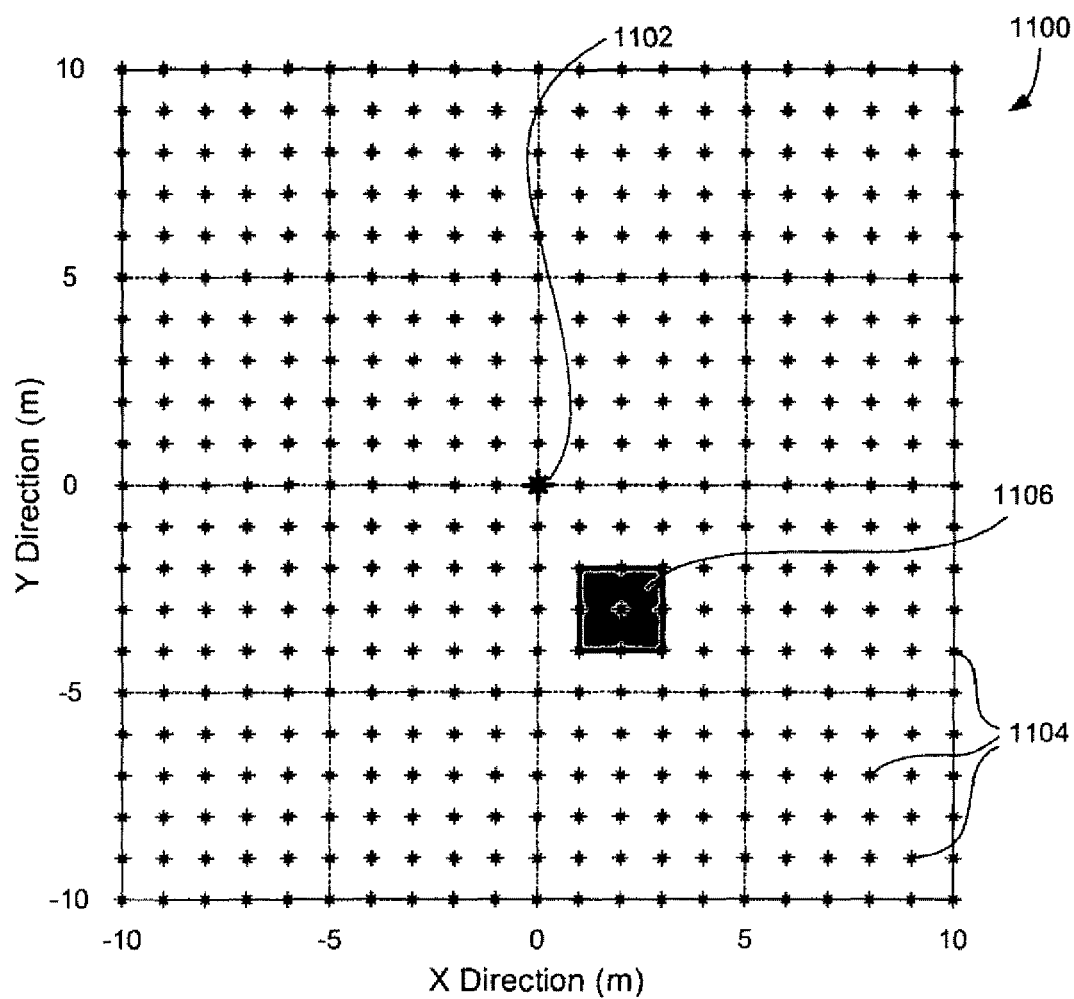
FIGS. 11A and 11B illustrate the grid structure used to refine the sensor location from an initial estimate of the sensor location.
Figure 11B:
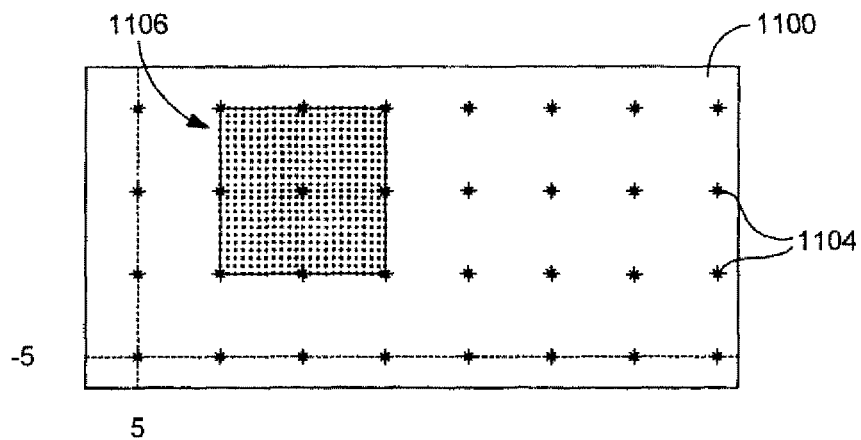

In step 830, the error is calculated for every point 1104 in the defined calculation grid 1100 (see FIG. 11A). With reference to FIGS. 11A and 11B, the error can be calculated by actually considering a finer grid 1106 at each selected point 1104, and computing the averaged weighted mean squared error of the finer grid. Computing the error at each point 1104 in this manner is not required, however, and one can ignore the finer grid 1106, if desired. However, use of the liner grid 1106 increases the accuracy of the calculation.

Returning to FIG. 8, a new sensor location is established based on the minimum error as indicated in step 832; moreover, the minimum error is stored as the calculated error. Whichever point gives the minimum error is designated as estimated sensor location point (K,L). In step 834, we use this location to generate another coarse grid around it. The procedure then returns to step 826.

It should be emphasized that the above-described embodiments are merely possible examples of implementations. Many variations and modifications may be made to the above-described embodiments. All such modifications and variations are intended to be included herein within the scope of this disclosure and the present disclosure and protected by the following claims.

What is claimed is:

1. An apparatus for locating a non-GPS equipped stationary sensor node, said stationary sensor node having been haphazardly disbursed over a geographical area by a vehicle, the apparatus comprising:
   a processing unit that receives stationary sensor node data and known source trajectory information data for a known source, wherein the stationary sensor node data includes but is not limited to normalized amplitude of the time domain data and is related to the trajectory information data of a known source, wherein a data, point in the trajectory information data thr a known source comprises a time stamp, which corresponds to a given time, and coordinates of the known source at the given time, wherein the processing unit is adapted to correlate at least a portion of the stationary sensor node data with at least a portion of the known source trajectory information data and the absolute position of the known source to determine an absolute position of the stationary sensor node,
   said known source is a moving vehicle whose position at any given point is known and further comprises means for being detected by said stationary non-GPS equipped sensor node.

2. The apparatus of claim 1, wherein the non-GPS equipped stationary sensor node data includes a sensor node bearing angle, which is measured from a local reference axis to a ray extending from the stationary sensor node towards a given point, wherein the local reference axis is offset from a global reference axis by an offset angle, wherein the processing unit is adapted to synchronize the non-GPS equipped stationary sensor node data with the known source trajectory information data to eliminate the offset angle.

3. The apparatus of claim 1, wherein the processing unit is adapted to selectively exclude data points in the trajectory information data of the known source such that the portion of the trajectory information data that is correlated with the sensor node data is a subset of the entire trajectory information data.

4. The apparatus of claim 1, wherein the processor unit is adapted to determine a first estimate of the non-GPS equipped stationary sensor node coordinates, determine an offset angle using the first estimate of the sensor node coordinates, and determine a second estimate of the sensor node coordinates using the offset angle and at least a portion of the known source trajectory information data.

5. The apparatus of claim 1, wherein the processor unit is adapted to synchronize at least a second portion of non-GPS equipped stationary sensor node data with at least a second portion of the known source trajectory information data.

6. The apparatus of claim 1, further including:
   a non-GPS equipped stationary sensor node that acquires data regarding the known source, wherein the sensor node is adapted to provide the sensor node data to the processing unit.

7. The apparatus of claim 2, wherein the processing unit is adapted to determine an estimate of the absolute position of the non-GPS equipped stationary sensor node using at least the difference in a pair of sensor node bearing angles and at least two data points included in the known source trajectory information data.

8. The apparatus of claim 3, wherein the processing unit excludes a data point of the trajectory information responsive to the data point corresponding to a first position that is less than a specific distance from a second position.

9. A program embodied in a non-transitory computer readable medium, the program comprising:
   logic configured to receive known source trajectory information data for a moving vehicle whose absolute position is known at any given point, wherein the known source trajectory information data is collected over a first time span;
   logic configured to receive sensor node data, wherein the sensor node data is acquired over a second normalized amplitude time span and is related to the object trajectory information data;
   logic configured to determine several direction indicators, each direction indicator providing an approximate sensor node bearing from the non-GPS equipped stationary sensor node to the known source at given instant of time during the second normalized amplitude time span; and
   logic configured to determine coordinates of the non-GPS equipped stationary sensor node using at least a portion of the collected trajectory information data and at least a portion of the acquired sensor node data.

10. The program of claim 9, wherein the trajectory information data includes multiple data points, each data point associates a specific instant of time with a position of the a moving vehicle whose position is known at any given point at the specific instant of time.

11. The program of claim 9, wherein the sensor node data includes multiple data points, further including logic configured to:
   determine a first bearing angle for a first data point included in the trajectory information data;
   determine a second bearing angle for a second data point included in the trajectory information data;
   determine the difference between the first and second bearing angles;
   determine whether the difference between the first and second bearing angles is greater than a predetermined amount; and
   responsive to the difference being greater than the predetermined amount, determine not to use the second data point.

12. The program of claim 9, wherein the logic configured to determine coordinates of the sensor node further includes logic configured to:
   determine a first estimate of the sensor node coordinates;
   determine an offset angle using the first estimate of the sensor node coordinates;
   determine a second estimate of the sensor node coordinates using the offset angle and trajectory information data.

13. The program of claim 9, wherein the logic configured to determine coordinates of the sensor node further includes logic configured to:
   determine a first estimate of the sensor node coordinates;
   determine a set of sensor node bearing angles from the sensor node data;
   determine a set of object bearing angles using the first estimate of the sensor node coordinates and the trajectory information data;
   define a grid about the first estimate of the sensor node coordinates;
   determine for points on the grid the error between the set of sensor node hearing angles and the set of object bearing angles; and
   determine a second estimate of the sensor node bearing angles based upon the determined errors.

14. The program of claim 10 wherein the logic configured to determine the coordinates further includes logic configured to:
   choose a first data point from the trajectory information data and selectively choose a second data point from the trajectory information data based upon a parameter and the first data point.

15. The program of claim 12, wherein the logic configured to determine a second estimate of the sensor node coordinates further includes logic configured to:
   select data points of the trajectory information data in sets of points;
   for each set of data points of the trajectory information data, use a set of data points of the trajectory information data to determine a third estimate of the sensor node coordinates; and
   average the set of third estimates of the sensor node coordinates, wherein the average of the set of third estimates of the sensor node coordinates is the second estimate of the sensor node coordinates.

16. The program of claim 13, wherein the logic configured to determine a second estimate of the sensor node coordinates further includes logic configured to:
   synchronize the sensor node data with the trajectory information data.

17. The program of claim 14, wherein the first data point is defined by a first position and a first time, the second data point is defined by a second position and a second time, the parameter corresponds to a specific distance, and the first and second positions are separated by a distance that is greater than the specific distance.

* * * * *